United States Patent
Döring et al.

(10) Patent No.: US 9,442,543 B2
(45) Date of Patent: Sep. 13, 2016

(54) NETWORK AND METHOD FOR OPERATING A NETWORK

(75) Inventors: Martin Döring, Braunschweig (DE); Olaf Krieger, Lostau (DE); Andreas Titze, Braunschweig (DE); Henning Harbs, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 653 days.

(21) Appl. No.: 13/881,579

(22) PCT Filed: Oct. 24, 2011

(86) PCT No.: PCT/EP2011/005348
§ 371 (c)(1),
(2), (4) Date: Jun. 20, 2013

(87) PCT Pub. No.: WO2012/055526
PCT Pub. Date: May 3, 2012

(65) Prior Publication Data
US 2013/0275784 A1    Oct. 17, 2013

(30) Foreign Application Priority Data

Oct. 27, 2010    (DE) .................. 10 2010 049 834

(51) Int. Cl.
*B60L 1/00*    (2006.01)
*B60L 3/00*    (2006.01)
(Continued)

(52) U.S. Cl.
CPC ............... *G06F 1/26* (2013.01); *H04L 12/10* (2013.01); *H04L 12/40045* (2013.01); *H04L 12/12* (2013.01); *H04L 12/40039* (2013.01); *H04L 2012/40273* (2013.01)

(58) Field of Classification Search
CPC ...... H04B 5/0037; H04B 10/40; H04B 7/14; B60R 16/03; B60R 16/033; B60R 16/02; B60R 16/0307; B60R 16/04; B60R 25/02142; B60R 25/0215; B60R 25/40
USPC ........................................................ 307/9.1
See application file for complete search history.

(56) References Cited

U.S. PATENT DOCUMENTS 4,577,221 A * 3/1986 Skinner, Sr. ............. H04N 7/10
348/E7.049
5,826,037 A * 10/1998 Stiegler ............... B60R 16/0315
370/222

(Continued)

FOREIGN PATENT DOCUMENTS

DE    102008030222 A1    12/2009
WO    2006055163 A1    5/2006

OTHER PUBLICATIONS

Gartner; Saft und Daten. IX extra; Jan. 2005.
(Continued)

*Primary Examiner* — Jared Fureman
*Assistant Examiner* — Esayas Yeshaw
(74) *Attorney, Agent, or Firm* — Barnes & Thornburg LLP

(57) ABSTRACT

A network, in particular in a motor vehicle, wherein the network includes a central subscriber and at least one first subscriber, wherein the central subscriber and the at least one first subscriber are interconnected by way of at least one first cable. The central subscriber has at least one signal coupling unit and at least one energy coupling unit, wherein by way of the signal coupling unit an AC voltage can be impressed on at least one first line of the first cable, or can be tapped from the signal coupling unit. Also disclosed is a method for operating a network.

18 Claims, 5 Drawing Sheets

(51) Int. Cl.
*G06F 1/26* (2006.01)
*H04L 12/10* (2006.01)
*H04L 12/12* (2006.01)
*H04L 12/40* (2006.01)

(56) References Cited

U.S. PATENT DOCUMENTS

| | | | |
|---|---|---|---|
| 6,535,983 B1 | 3/2003 | McCormack et al. | |
| 7,170,194 B2* | 1/2007 | Korcharz | H02J 1/10 307/21 |
| 7,711,383 B2* | 5/2010 | Namm | H04W 4/10 455/11.1 |
| 7,921,310 B2* | 4/2011 | Diab | H04L 12/10 370/419 |
| 8,836,467 B1* | 9/2014 | Cohn | G08B 25/003 340/3.32 |
| 8,935,435 B2* | 1/2015 | Reidt | H04L 12/40013 710/1 |
| 2005/0057099 A1* | 3/2005 | Flock | H05K 7/1432 307/10.1 |
| 2008/0005602 A1* | 1/2008 | Diab | H04L 12/10 713/300 |
| 2008/0024106 A1 | 1/2008 | Landry et al. | |
| 2009/0228722 A1* | 9/2009 | Lin | H04L 12/10 713/300 |
| 2010/0008372 A1* | 1/2010 | Weber | H04L 12/40 370/401 |
| 2010/0153751 A1 | 6/2010 | Tseng et al. | |
| 2011/0296180 A1* | 12/2011 | Paeschke | G09F 3/0292 713/168 |

OTHER PUBLICATIONS

Mendelson; All You Need to Know About Power over Ethernet (PoE) and the IEEE 802.3af Standard; Jun. 2004; http://www.powerdsine.com/Documentation/WhitePapers/PoE_and_IEEE802_3af.pdf.
Search Report for German Patent Application No. 10 2010 049 834.3; Nov. 2, 2011.
Search Report for International Patent Application No. PCT/EP2011/005348; Feb. 6, 2012.

* cited by examiner

NETWORK AND METHOD FOR OPERATING A NETWORK

PRIORITY CLAIM

This patent application is a U.S. National Phase of International Patent Application No. PCT/EP2011/005348, filed 24 Oct. 2011, which claims priority to German Patent Application No. 10 2010 049 834.3, filed 27 Oct. 2010, the disclosures of which are incorporated herein by reference in their entirety.

FIELD

Disclosed embodiments relate to a network and to a method for operating a network.

BACKGROUND

Controllers in motor vehicles can communicate via various bus systems, such as CAN, MOST, FlexRay or LIN bus systems. The cited bus systems differ in terms of their properties, such as a data rate for data to be transmitted, connector and cable types, number of controllers that can be connected to the bus system, maximum admissible cable length, etc. Power can be supplied to the controllers from an onboard power supply system, usually via what are known as terminals. In this case, controllers can be supplied with power from an onboard power supply system only when required or constantly.

In the case of constantly supplied controllers, there is the problem that such controllers are a constant load on the energy stores in the motor vehicle, particularly the onboard power supply system battery, which can result in the onboard power supply system battery being drained completely. Methods for network management have therefore been developed which can put controllers into a switched-off state or a sleep state when required, from which state they can then be awoken. Switching off or putting controllers into a sleep state allows a reduction in energy consumption by the controllers, which relieves the load on the onboard power supply system battery.

With the aim of further energy saving, methods are currently being developed for operating networks in what is known as a partial network mode. In this case, it is meant to be possible to specifically connect and disconnect selected controllers, and hence to allow them to communicate with one another only as required, even during a driving mode of the motor vehicle. However, implementing such a partial network mode requires complex logic to be integrated into the transceiver chips and controllers of the respective bus system. In addition, suitable control is necessary for coordinating the network state. This increases the system complexity, which is high anyway, and creates an increased potential for error.

In contrast to CAN, FlexRay and LIN bus systems, Ethernet allows DC-free communication. In bus systems implemented at Ethernet, it is therefore possible for a communication signal, usually an AC voltage signal, to be modulated onto a DC voltage without needing to fear losses in a quality of the communication. DE 10 2008 030 222 A1 discloses a controller for communicating with a differential bus system, wherein the controller comprises a coupling unit for supplying and/or detecting a signal, the coupling unit using a common potential with a further unit connected to the bus system.

When controllers are supplied with power from an onboard power supply system, there may be a need to transform a voltage level of the onboard power supply system voltage to a voltage level of an operating voltage for the respective controller. For such a transformation, it is possible to use what are known as switched-mode regulators and what are known as in-phase regulators, inter alia. In a switched-mode regulator, an input voltage for the switched-mode regulator is periodically switched on and off and passed to a storage element. Depending on the ratio of switched-on to switched-off time, a particular average voltage is established at the output of the switched-mode regulator or the storage element. An advantage in this context is low power loss, but disadvantages are a high level of circuit complexity and EMC disturbances as a result of fast switching operations.

By contrast, in-phase regulators afford the advantage of a lower-disturbance output voltage, but have poorer efficiency than switched-mode regulators on account of relatively great heat loss. However, there is the problem that when the controllers are supplied with power from the onboard power supply system, it is necessary for each controller to have at least one of the regulators described above associated with it.

SUMMARY

The technical problem which arises is that of providing a network and a method for operating a network which ensures a reduction in network elements, particularly elements for wiring, and allows a simple and safe and also energy-saving partial network mode.

The solution to the technical problem is obtained from the subjects having the features of the claimed invention.

Disclosed embodiments provide a network, particularly a network in a motor vehicle. In this case, the network may be a DC-free network, particularly an Ethernet network.

BRIEF DESCRIPTION OF THE DRAWINGS

The invention is explained in more detail with reference to a plurality of disclosed embodiments. In the figures.

DETAILED DESCRIPTION OF THE DISCLOSED EMBODIMENTS

Figure 1:
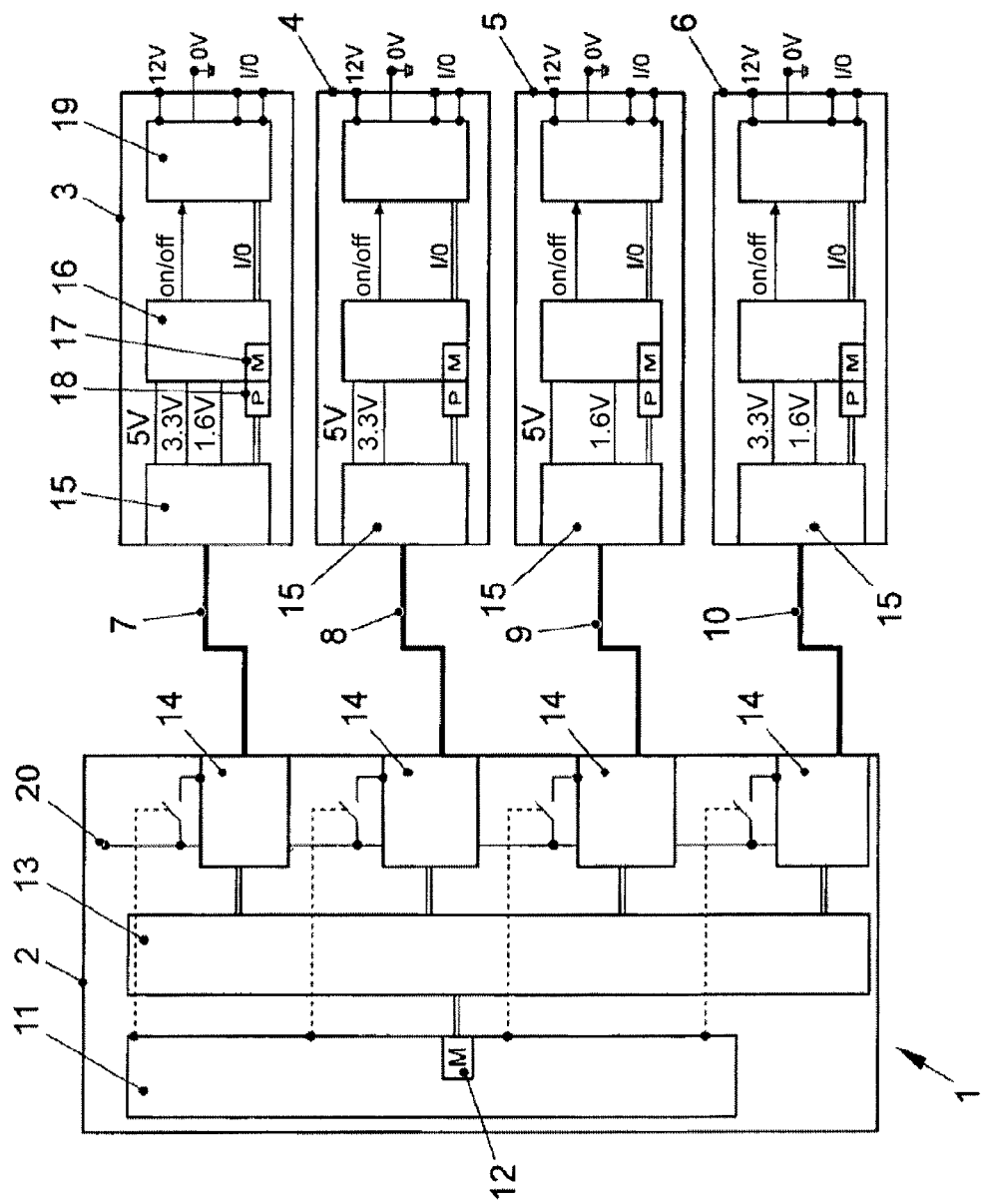
FIG. 1 shows a schematic overview of a network.

In the text which follows, the same reference symbols denote elements having the same or similar technical properties.

In accordance with the disclosed embodiments, the network comprises a central subscriber and at least one first subscriber. The central subscriber may in this case be a central controller, particularly what is known as a gateway.

The first subscriber may be a peripheral controller. The network may also comprise further subscribers besides the first subscriber. The central subscriber and the at least one first subscriber are connected via at least one first cable. Similarly, further subscribers may be connected to the central subscriber via respective further cables. Overall, this results in what is known as a star topology for the network.

The central subscriber comprises at least one signal coupling unit and at least one energy coupling unit. The signal coupling unit can be used to impress or tap off an AC voltage onto or from at least one first line of the first cable. In this case, the AC voltage is used for transmitting data for communication between the central subscriber and the first subscriber. Communication is possible bidirectionally in this case. When data are sent, the central subscriber, for example, impresses an appropriate AC voltage onto the at least one first line of the first cable. When data are received, the central subscriber taps off the relevant AC voltage from the at least one first line of the first cable.

The energy coupling unit can be used to impress a DC voltage at a predetermined voltage level onto the first line of the first cable. The AC voltage and the DC voltage may therefore be impressed onto the first line of the first cable simultaneously. It is thus possible for the AC voltage to be modulated onto the DC voltage.

The at least one first subscriber also comprises a signal coupling unit and at least one energy coupling unit. The signal coupling unit can be used to tap off or impress an AC voltage from or onto the at least one first line of the first cable. In this case, the signal coupling unit is used for bidirectional communication with the central subscriber at an AC voltage impressed onto the first line. The energy coupling unit of the first subscriber can be used to tap off the DC voltage, which can be impressed onto the first line of the first cable via the central subscriber, from the at least one first line of the first cable.

According to at least one disclosed embodiment, the first DC voltage is a first operating voltage for the first subscriber or can be transformed into the first operating voltage for the first subscriber, for example at a voltage transformer, which may be part of the energy coupling unit of the first subscriber. In addition, the first operating voltage can be applied to at least one first input of the first subscriber.

In this case, the first DC voltage is a first operating voltage for the first subscriber or can be transformed into such an operating voltage. It therefore corresponds to a supply voltage that is necessary for operating the subscriber, e.g. a controller, for example a supply voltage of 5 V.

In this case, the first subscriber may have a plurality of inputs to which voltages at different voltage levels can be applied. By way of example, the first operating voltage can be used for supplying power to a microcontroller of the first subscriber. A second operating voltage can be used for supplying voltage to memory units of the first subscriber.

Also according to at least one disclosed embodiment, the first subscriber comprises a signaling unit or the first subscriber has an associated signaling unit, wherein the signaling unit can be used to produce a requirement signal in a disconnected or sleeping state of the first subscriber. The requirement signal can be transmitted from the signaling unit to the central subscriber via at least one line connecting the first and central subscribers, for example the first line of the first cable.

A sleep state (sleep mode) denotes an energy-saving state of the first subscriber. In this case, the first subscriber is supplied with power such that when it is awoken from the sleep state it is put into an operating state which is the same as the operating state which the first subscriber was in when this sleep state was activated. This forms the essential difference in comparison with the disconnected state of the subscriber. When connected from the disconnected state, the first subscriber is put into an initial state, which usually does not correspond to the operating state in which the first subscriber was disconnected. An energy requirement for the first subscriber in the disconnected state is also lower than in the sleep state.

In this case, the requirement signal is used for signaling a communication requirement of the first subscriber. In a disconnected state or sleep state, the energy consumption of the first subscriber is thus reduced in comparison with an operating or communication state, but no communication can take place between the central subscriber and the first subscriber. If the first subscriber needs to communicate in such a state, the first subscriber needs to be awoken from the disconnected state or sleep state. According to the disclosed embodiments, the awakening can also or exclusively be initiated upon signaling of a communication requirement by the first subscriber. This so-called reverse waking advantageously allows the network to be operated in the "partial network mode" in a manner which is simple and, from the point of view of control logic, uninvolved. In this case, the term reverse waking comprises awakening or connection upon signaling of a communication requirement of the first subscriber.

By way of example, a requirement signal can be produced when a communication requirement of the first subscriber is detected. By way of example, a communication requirement of the first subscriber can be obtained as a result of evaluation of signals from a sensor which is directly associated with the first subscriber. By way of example, a direct association can be understood to mean that the sensor is connected to an input interface of at least the first subscriber physically, for example at least one line. In this case, the sensor may be connected directly to the input interface of at least the first subscriber, i.e. signals from the sensor are transmitted to the first subscriber directly and not to the first subscriber via further subscribers, as in the case of a bus system, for example. The sensor may also be hard wired to the first subscriber. A direct association can also be understood to mean that the sensor is connected exclusively to the first subscriber physically, for example at least one line.

In this case, the sensor may also be an operator control element which can be controlled manually, e.g. by a motor vehicle driver. By way of example, the sensor may be an operator control element for an electric window lifter, the operator control element being physically connected to a controller for the servomotor for the purpose of adjusting the window pane. In this case, the controller for the servomotor is the first subscriber according to the disclosed embodiments. When a motor vehicle driver operates the operator control element, for example, a communication requirement of the first subscriber is detected and therefore a requirement signal is produced.

The production of a requirement signal as initiated from an evaluation of signals from a sensor which is directly associated with the first subscriber advantageously allows the implementation of reverse waking which is independent of central logic. In particular, the sensor no longer needs to be connected to a central control unit, for example the central subscriber, physically, for example at lines, so that a communication requirement can be established and the first subscriber can be awoken. It is therefore advantageously possible to dispense with elements for wiring the sensor associated with the first subscriber to a central logic, for example a central controller.

In a further disclosed embodiment, the central subscriber can be used to detect the requirement signal, wherein the energy coupling unit of the central subscriber can be used to impress the first DC voltage of the first subscriber at least onto the first line of the first cable when the requirement signal is detected. Impressing the first DC voltage of the first subscriber switches on the latter from a disconnected state or awakes it from a sleep state. As a further advantage, this results in the first subscriber being supplied with the first operating voltage, that is to say being switched on or awoken, only when the central subscriber detects the requirement signal.

In the switched-on or awoken state, power for supplying the first subscriber is transmitted via the same line via which AC voltage signals for communication or data transmission between the subscribers are also transmitted. Hence, the first subscriber advantageously no longer needs to be connected to an onboard power supply system or connected to the latter for the purpose of supplying power when the first subscriber is awoken or switched on. This advantageously means that switching elements for the electrical connection, particularly also elements for wiring and/or regulators, of the first subscriber to the onboard power supply system can be dispensed with. Particularly when the central subscriber is connected to further subscribers besides the first subscriber, a central supply of power to the first and further subscribers can be provided from the central subscriber. This advantageously allows switching elements for electrically connecting the first and further subscribers to the onboard power supply system to be dispensed with for the first subscriber and all further subscribers.

In yet another disclosed embodiment, the signaling unit can be used to produce a requirement voltage at a predetermined voltage level as a requirement signal, wherein the energy coupling unit of the first subscriber can be used to impress the requirement voltage onto at least one line connecting the first and central subscribers, for example the first line of the first cable. In particular, the requirement voltage may be a DC voltage. This advantageously results in the requirement signal being able to be transmitted via already existing elements for electrical connection between the central subscriber and the first subscriber.

In still another disclosed embodiment, the energy coupling unit of the central subscriber can be used to tap off the requirement voltage from the first line and to apply it to a detection input of the central subscriber. An evaluation unit of the central subscriber can be used to evaluate whether the voltage applied to the detection input exceeds a predetermined voltage level. In addition, the energy coupling unit of the central subscriber can be used to impress the first DC voltage onto at least the first line of the first cable when the voltage applied to the detection input exceeds the predetermined voltage level. This advantageously results in an easy-to-implement manner of operation for the reverse waking described above. Particularly by comparing the transmitted requirement voltage with a predetermined voltage level, it is possible to implement waking or connection which is more independent of spurious voltages.

In at least disclosed embodiment, a level of the requirement voltage is lower than a level of the first operating voltage for the first subscriber and/or of an operating voltage for the central subscriber. If a level of the first operating voltage for the first subscriber is 5 V, for example, a level of the requirement voltage may be 2 V, for example. If a level of the requirement voltage is lower than a level of an operating voltage for the central subscriber, the requirement voltage cannot be used to awaken or switch on the central subscriber and particularly cannot be used to supply power to the central subscriber. In this case, the central subscriber thus cannot be supplied with power at the requirement voltage or a DC voltage transmitted from the first subscriber to the central subscriber. A level of the requirement voltage may also be lower than the levels of all the operating voltages for the first subscriber. This advantageously results in less power for signaling a communication requirement needing to be transmitted from the first subscriber to the central subscriber, which means that the reverse waking is of energy saving design.

In a further disclosed embodiment, the signaling unit of the first subscriber comprises at least one switching unit. Via the switching unit, the signaling unit can be connected to a voltage source. In this case, the voltage source may be a battery or a storage battery, the output voltage of which is at the level of the requirement voltage. The signaling unit may also additionally comprise at least one voltage transformer, wherein the voltage transformer can be connected to the voltage source at the switching unit. In this case, an output voltage from the voltage source may be higher or lower than the level of the requirement voltage. In this case, the voltage source may be the onboard power supply system or the onboard power supply system battery, for example. The voltage transformer can be used to convert a level of the output voltage from the voltage source to the level of the requirement voltage. The requirement voltage is thus then applied to at least the first line of the first cable when the switching unit sets up an electrical connection between the signaling unit and the voltage source. In this case, the switching unit can be controlled at a control unit, wherein the control unit evaluates signals from a sensor, for example, which is directly associated with the first subscriber. It is also possible for the switching unit to be directly connected to the sensor which is directly associated with the first subscriber. This advantageously results in a requirement signal being able to be transmitted to the central subscriber independently of a state of the first subscriber, particularly independently of a switched-off state or a sleep state of the first subscriber.

In yet another disclosed embodiment, the energy coupling unit of the first subscriber comprises at least one voltage transformer, wherein the at least one voltage transformer can be used to alter the voltage level of the first operating voltage. The first operating voltage with the altered voltage level can be applied to at least one further input of the first subscriber. If the first subscriber comprises, by way of example, a first input for supplying power to a microcontroller and a second input for supplying power to memory units, the voltage transformer can be used to transform the DC voltage tapped off from the first line of the first cable, which voltage in this case corresponds to the first operating voltage, such that it can be applied to the second input, as a result of which it is possible for power for supplying the memory units likewise to be transmitted via the first line of the first cable. It goes without saying that the energy coupling unit of the first subscriber may comprise further voltage transformers which can be used to transform the tapped-off DC voltage to a voltage level for further inputs of the first subscriber.

In still another disclosed embodiment, the first cable comprises a second line, wherein the energy coupling unit of the central subscriber can be used to impress a further DC voltage of the first subscriber onto the second line of the first cable. The energy coupling unit of the first subscriber can be used to tap off the further DC voltage from the second line of the first cable. The further DC voltage may be a further operating voltage for the first subscriber or may be able to be transformed into the further operating voltage, for example at a voltage transformer, which may be part of the energy coupling unit of the first subscriber.

In this case, two scenarios are conceivable: in the first scenario, a voltage level of the further DC voltage is equal to the voltage level of the first DC voltage, the further DC voltage likewise being able to be applied to the first input of the first subscriber. In this scenario, it is advantageously possible for an identical DC voltage to be transmitted on both lines. This results in the line cross section being doubled, which means that it is advantageously possible for a higher power to be transmitted from the central subscriber to the first subscriber, particularly to the first input of the first subscriber.

In a second scenario, the voltage level of the further DC voltage is different than the voltage level of the first DC voltage, the further DC voltage in this scenario being able to be applied as a further operating voltage to a further input of the first subscriber. This advantageously results in the first line of the first cable being able to be used for supplying power to the first input of the first subscriber, for example for supplying power to a microcontroller of the first subscriber, with the second line being able to be used for supplying power to the second input of the first subscriber, for example for supplying power to memory units of the further subscriber.

It goes without saying that the energy coupling unit of the first subscriber may comprise at least one further voltage transformer, wherein the at least one further voltage transformer can be used to alter the voltage level of the further operating voltage, wherein the voltage with the altered voltage level can be applied to the further input or to the first input of the first subscriber.

In a further disclosed embodiment, the predetermined voltage level of the second DC voltage impressed onto the second line of the first cable corresponds to a ground potential, wherein the energy coupling unit of the first subscriber can be used to tap off the second DC voltage from the second line of the first cable and to apply it to a ground input of the first subscriber. This advantageously results in the first subscriber not needing to be connected to a vehicle ground connection, since an appropriate ground potential is provided by the central subscriber at the second line of the first cable.

The lines of the first cable are used primarily for communication between the central subscriber and the first subscriber. When the first operating voltage is impressed by the central subscriber onto the first and/or second line of the first cable, it should be noted that the applied operating voltage needs to be chosen on the basis of a DC resistance, a length and a current flow through the first and/or second line. In particular, a first operating voltage impressed by the central subscriber should be chosen such that a voltage drop across the first and/or second line is taken into account.

In this case, the voltage transformer may be an in-phase regulator as explained above. In particular, the voltage transformer, particularly the in-phase regulator, can be used to lower the voltage level of the DC voltage tapped off from the first line of the first cable.

Disclosed embodiments also provide a method for operating a network, particularly in a motor vehicle. In this case, the network is designed in accordance with the disclosed embodiments of the network which are outlined above. In a communication state of the first subscriber, a signal coupling unit of the central subscriber is used to impress or tap off an AC voltage onto or from at least one first line of a first cable, wherein an energy coupling unit of the central subscriber is used to impress a first DC voltage at a predetermined voltage level onto the first line of the first cable. In this case, the communication state denotes an active state of the first subscriber, which does not correspond to a disconnected state or a sleep state of the first subscriber. In particular, the first subscriber is supplied with electric power via at least the first line of the first cable in the communication state. According to the disclosed embodiments, the first subscriber comprises a signaling unit, wherein the signaling unit is used to produce a requirement signal in a disconnected or sleeping state of the first subscriber when there is a communication requirement, wherein the requirement signal is transmitted from the signaling unit to the central subscriber via at least one line connecting the central and first subscribers.

FIG. 1 shows a network 1 according to the disclosed embodiments. The network 1 comprises a central subscriber 2, which can also be called a gateway. In addition, the network 1 comprises a first subscriber 3, a second subscriber 4, a third subscriber 5 and a fourth subscriber 6. The central subscriber 2 is connected to the first subscriber 3 at a first cable 7. Similarly, the central subscriber 2 is connected to the subscribers 4, 5, 6 at a second cable 8, a third cable 9 and a fourth cable 10. The central subscriber 2 therefore serves as a star point in what is known as a star topology. The central subscriber 2 comprises a microcontroller 11 having what is known as an MAC unit (media access control unit) 12. In addition, the central subscriber 2 comprises an Ethernet switch 13 and, for each further subscriber 3, 4, 5, 6 connected to the central subscriber 2, an energy coupling unit 14, which is in the form of a DC voltage coupler.

A design for a further subscriber 3, 4, 5, 6 is explained by way of example in the design of the first subscriber 3. The first subscriber 3 likewise comprises an energy coupling unit 15, which is likewise in the form of a DC voltage coupler. In addition, the first subscriber 3 comprises a microcontroller 16 having an internal MAC unit 17, to which a physical layer 18 of the network, that is to say of the Ethernet, is connected. In addition, the first subscriber 3 comprises a controller peripheral area 19 for executing predetermined applications. The MAC unit 17 of the first subscriber 3, which MAC unit is contained in the microcontroller 16, regulates Ethernet communication with the central subscriber 2.

In the transmission direction, the Ethernet switch 13 of the central subscriber 2 converts digital signals from the MAC unit 12 into analog transmission signals and distributes them over the respective communication paths, which are shown as cables 7, 8, 9, 10, using what is known as point-to-point communication. In the subscribers 3, 4, 5, 6, the physical layer 18 digitizes these analog signals again. The microcontroller 11 of the central subscriber 2 has network information available in it. For this information, it is possible to infer a communication requirement for the further subscribers 3, 4, 5, 6. On the basis of this network information, the further subscribers 3, 4, 5, 6 can be specifically switched on or off as required. This switching-on or switching-off is effected by connecting or disconnecting a DC voltage that can be coupled onto the lines 21, 22 (for example see FIG. 4) of the cables 7, 8, 9, 10 at the energy coupling units 14.

In the connected state of the further subscribers 3, 4, 5, 6, a DC voltage on which the Ethernet communication has been superimposed has been impressed onto the lines 21, 22 of the cables 7, 8, 9, 10. At the receiver, for example the first subscriber 3, the DC voltage is isolated from the communication signal in the energy coupling unit 15. In this case, the DC voltage is used for supplying power to the microcontroller 16, with the communication signal (Ethernet signal) being supplied to the MAC unit 17. When required, the microcontroller 16 can connect the controller peripheral area 19 and hence control the input/output interface (I/O interface) of the first subscriber 3, for example.

In this case, the energy coupling units 14 couple a DC voltage onto lines 21, 22 of the cables 7, 8, 9, 10, the DC voltage being provided by a central voltage source 20. In this case, the impressed DC voltage is used as an operating voltage for the further subscribers 3, 4, 5, 6 or can be converted into the required operating voltages. In this context, the first subscriber 3 is shown to require a first operating voltage at a level of 5 V, a second operating voltage at a level of 3.3 V and a third operating voltage at a level of 1.6 V. The second subscriber 4 requires a first operating voltage at a level of 5 V and a second operating voltage at a level of 3.3 V. The third subscriber 5 requires a first operating voltage at a level of 5 V and a second operating voltage at a level of 1.6 V. The fourth subscriber 6 requires a first operating voltage at a level of 3.3 V and a second operating voltage at a level of 1.6 V. In this case, the energy coupling units 14 of the central subscriber and/or the energy coupling units 15 of the further subscribers 3, 4, 5, 6 may comprise voltage transformers which can be used to, match the voltage provided by the central voltage source 20 to the required operating voltages of the further subscribers 3, 4, 5, 6.

If no DC voltage has been impressed onto the lines 21, 22 of the cables 7, 8, 9, 10, the controller peripheral area 19 is also completely disconnected. In this case, a quiescent current may be 0 A. Such network management is therefore advantageously very energy efficient. In this case, central logic for the network management is integrated in the central subscriber, which advantageously reduces complexity for the network management and increases robustness of the network. Since the combination of active and disconnected further subscribers 3, 4, 5, 6 can be chosen arbitrarily, it is therefore advantageously possible to implement any desired subnetwork mode.

Figure 2:
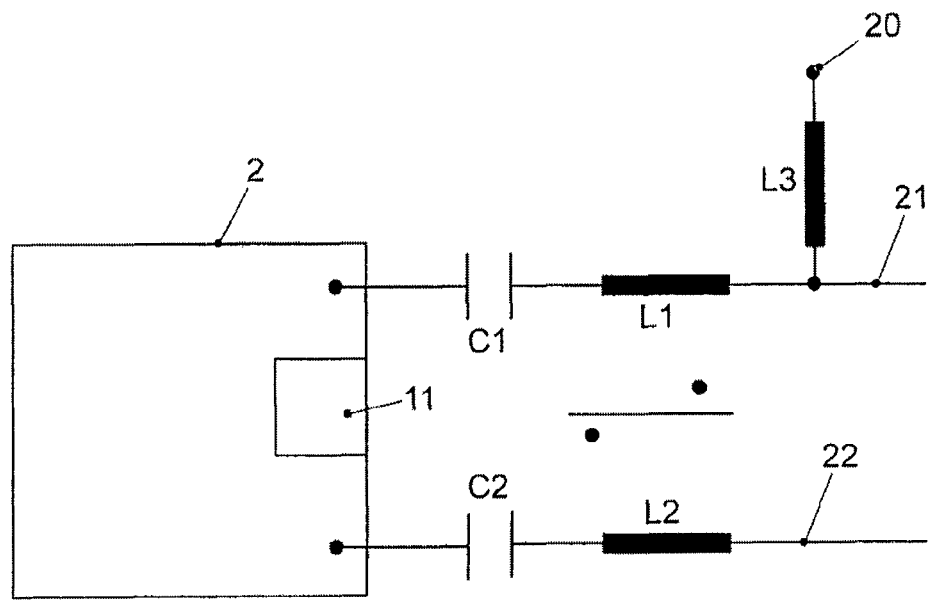
FIG. 2 shows a schematic illustration of a central subscriber.

FIG. 2 shows a schematic view of a central subscriber 2. In this case, particularly the impressing of an AC voltage and a first DC voltage onto a first line 21 of a first cable 7 by the central subscriber 2 (see FIG. 1) is shown. In this case, a signal coupling unit of the central subscriber 2 comprises a first capacitance C1, a second capacitance C2, a first inductance L1 and a second inductance L2. In this case, the first capacitance C1 and the first inductance L1 are arranged in the first line 21 of the first cable 7. In addition, the second capacitance C2 and the second inductance L2 are arranged in a second line 22 of the first cable 7. The microcontroller 11 and the MAC unit 12 and Ethernet switches 13, which are not shown in FIG. 2, can be used to impress an AC voltage onto the first and second lines 21, 22. In this case, the capacitors C1, C2 are used for decoupling the central subscriber 2 from a DC voltage which needs to be impressed onto the first line 21. In this case, the inductances L1, L2 are used as a common mode choke. This common mode choke has a plurality of identical, but bifilarly wound, windings which carry an operating current in opposite senses. The magnetic fields of the windings in the core of the common mode choke cancel each other out. In this case, the common mode choke is used for attenuating spurious emissions (EMI). The energy coupling unit 14 of the central subscriber 2 comprises an inductance L3, wherein the inductance L3—which is used for blocking high frequencies of the AC voltage used for communication—can be used to apply a first DC voltage, for example at a level of 5 V, to the first line 21. FIG. 2 shows that the first DC voltage is provided by the central voltage source 20.

Figure 3:
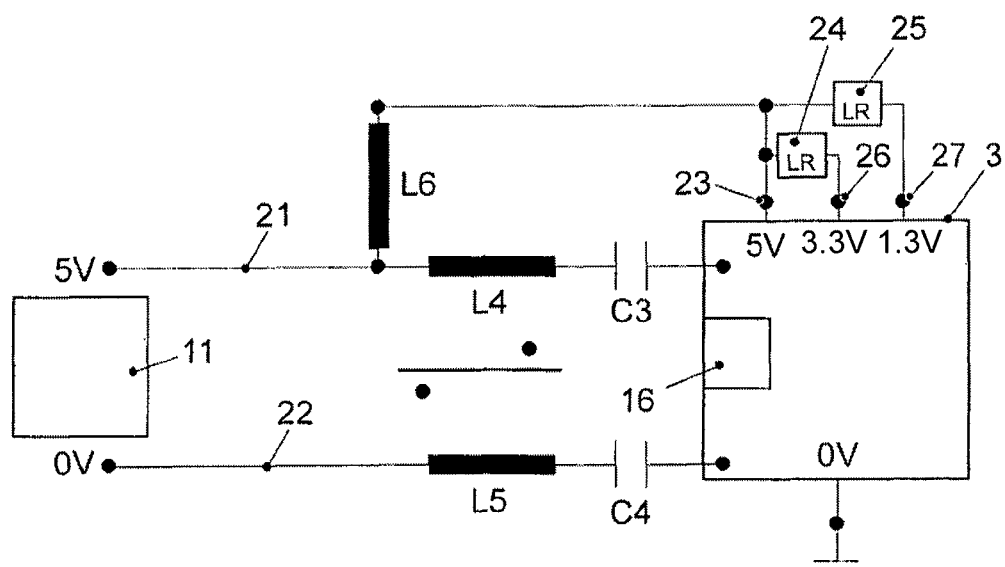
FIG. 3 shows a schematic illustration of a first subscriber.

FIG. 3 schematically shows a first subscriber 3. In this case, a signal coupling unit of the first subscriber 3 comprises, in a manner similar to the signal coupling unit of the central subscriber 2, a first capacitance C3 and a second capacitance C4 for the signal coupling unit of the first subscriber 3. In addition, this signal coupling unit comprises a first inductance L4 and a second inductance L5 for the signal coupling unit of the first subscriber 3. In this case, the capacitances C3, C4 and the inductances L4, L5 exercise the same functionality as the previously explained capacitances C1, C2 and inductances L1, L2 of the signal coupling unit of a central subscriber 2. An energy coupling unit 15 of the first subscriber 3 comprises, inter alia, a coil L6 which is used to tap off a first DC voltage from the first line 21. This figure shows that the first DC voltage tapped off in this manner is applied as a first operating voltage to a first input 23 of the first subscriber 3. In addition, the energy coupling unit 15 comprises a first in-phase regulator 24 and a second in-phase regulator 25. The first in-phase regulator 24 is used to convert the DC voltage impressed onto the first line 21, which DC voltage corresponds to the first operating voltage, to a voltage level of 3.3 V and to apply it to a second input 26 of the first subscriber 3. The second in-phase regulator 25 is used to transform a voltage level of the third operating voltage to a voltage level of 1.3 V and to apply it to a third input 27 of the first subscriber. Hence, three inputs of the first subscriber 3 can be supplied with a customized operating voltage at the DC voltage transmitted via the first line 21.

Figure 4:
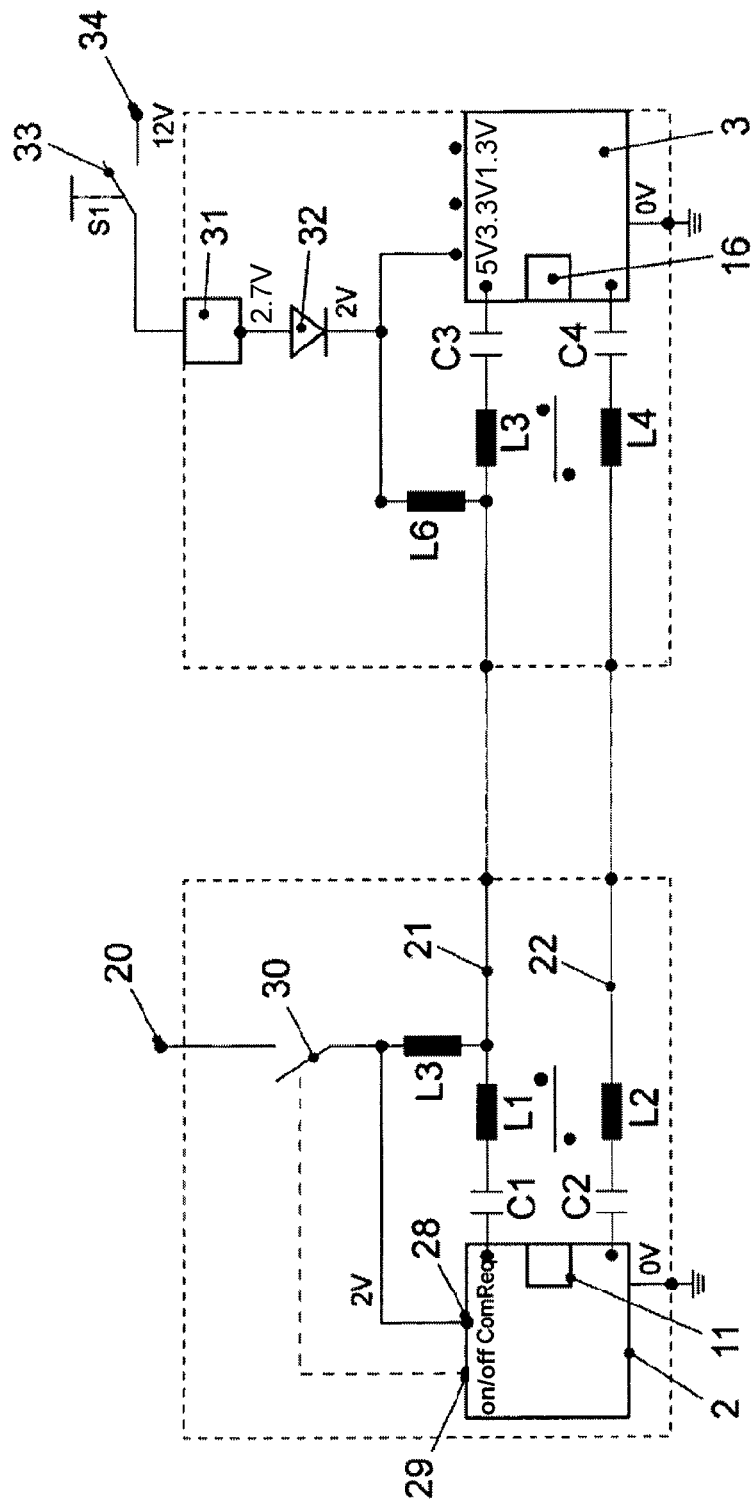
FIG. 4 shows a schematic illustration of a central subscriber and a first subscriber.

FIG. 4 shows a schematic interconnection of a central subscriber 2 and a first subscriber 3, with "reverse waking" being explained with reference to the circuit shown in FIG. 4. The central subscriber 2 has a detection input 28. The detection input can be used to tap off a voltage impressed on a first line 21. In addition, the central subscriber 2 has a switching output 29. The switching output 29 can be used to switch a switch 30 which connects a central voltage source 20 to the first line 21 via an inductance L3. A signaling unit of the first subscriber 3 has a voltage transformer 31 and a diode 32. In addition, the signaling unit has a switch 33. The switch 33 can be used to electrically connect the voltage transformer 31 to an onboard power supply system 34. In this case, the voltage transformer 31 transforms the level of an onboard power supply system voltage at a level of 12 V, for example, to a lower level, e.g. 2.7 V. In addition, what is known as a forward voltage for the diode 32 at a predetermined level, e.g. 0.7 V, drops across the diode 32. If the switch 33 is closed, the first line 21 is connected to the onboard power supply system via the inductance L6, the diode 32, the voltage transformer 31 and the switch 33. The voltage transformer 31 and the diode 32 transform the level of the onboard power supply system voltage down to a level of a requirement voltage, e.g. 2 V. The requirement voltage at a level of 2 V is then impressed onto the first line 21. In this case, the requirement voltage serves as a requirement signal, the requirement signal being able to be used to transmit a communication requirement to the central subscriber 2 in a disconnected or sleeping state of the first subscriber 3. In a sleeping or disconnected state of the first subscriber 3, the switch 30 is open, i.e. no DC voltage for supplying power to the first subscriber 3 is impressed onto the first line 21. Hence, no voltage is impressed on the first line 21. When the switch 33 of the signaling unit of the first subscriber 3 is closed, the requirement voltage at the predetermined voltage level is impressed onto the first line 21. The detection input 28 of the central subscriber 2 is used to tap off this requirement voltage from the first line 21 via the inductance L3. An evaluation unit, not shown, which may be integrated in the microcontroller 11 of the central subscriber 1, for example, is used to evaluate whether the voltage applied to the detection input 28 exceeds a predetermined voltage level, particularly the predetermined voltage level of the requirement voltage. If the voltage applied to the detection input 28 does exceed the predetermined voltage level, the switching output 29 is used to control the switch 30 such that it is closed and the central voltage source 20 is coupled to the first subscriber 3 via the inductance L3. This impresses a first DC voltage onto the first line 21 and supplies the first subscriber 3 with an operating voltage. At the same time, the switch 33 can be opened again.

Figure 5:
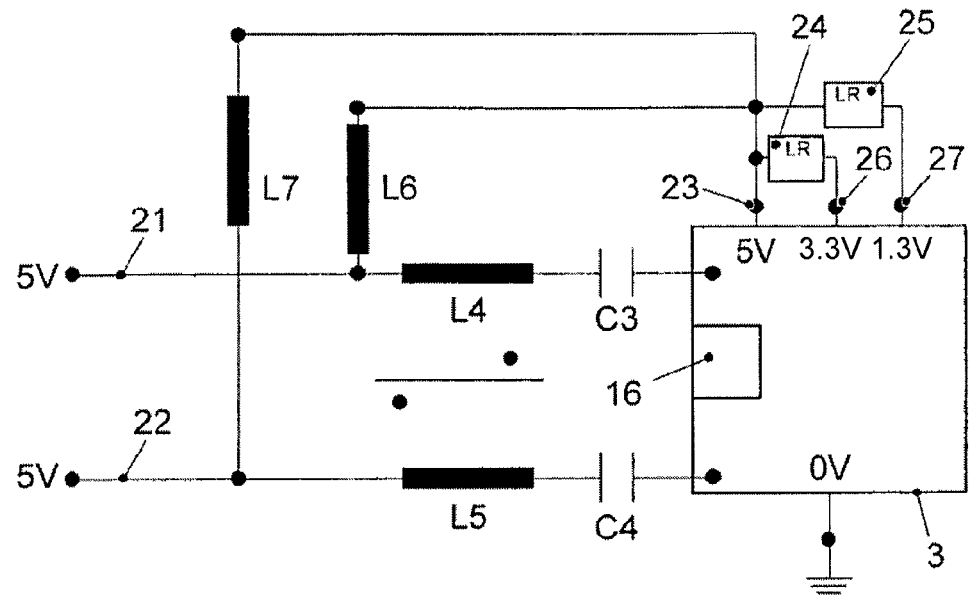
FIG. 5 shows a schematic illustration of another disclosed embodiment of a first subscriber.

FIG. 5 shows a schematic block diagram of the supply of voltage to a first subscriber 3 at a first and a second line 21, 22 of a first cable 7 (see FIG. 1). In this case, the first subscriber 3 is designed as shown in FIG. 3. In addition, however, the first input 23 of the first subscriber 3 and also the first and second in-phase regulators 24, 25 are electrically connected to the second line 22 of the first cable 7 at an inductance L7. The second line 22 can also have a second DC voltage at the same voltage level as that of the first DC voltage impressed onto it at an energy coupling unit 14 of a central subscriber 2 (see FIG. 1). This advantageously results in the conductor cross section being coupled, since a current for supplying power to the first subscriber 3 can also flow to the first subscriber 3 via the second line 22 in addition to the first line 21.

Figure 6:
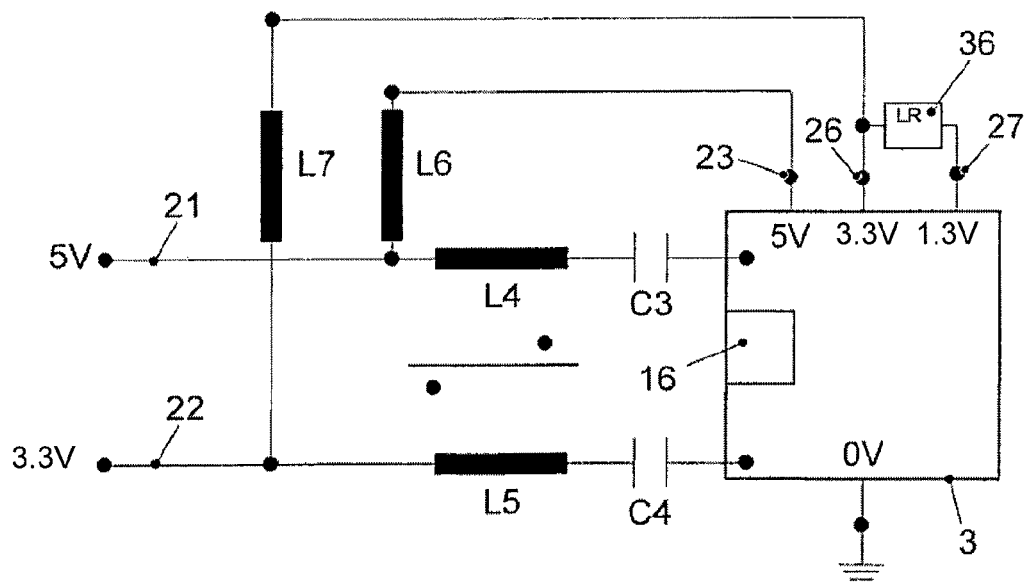
FIG. 6 shows a schematic illustration of yet another disclosed embodiment of a first subscriber.

FIG. 6 shows a supply of voltage to a first input of a first subscriber 3 via a first line 21 and also a supply of voltage to a second and a third input 26, 27 at a lower voltage level at a second line 22. In this case, the figure shows that, by way of example, the energy coupling unit 14 of a central subscriber 2 (see FIG. 1) is used to impress a first DC voltage, e.g. at a level of 5 V, which corresponds to a first operating voltage, onto the first line 21. This voltage is tapped off from the first line 21 via an inductance L6 and is applied to a first input 23 of the first subscriber 3. The energy coupling unit 14 or a further energy coupling unit of the central subscriber 2 is used to impress a second DC voltage, which is lower than the first DC voltage and corresponds to a second operating voltage, onto the second line 22. This voltage is tapped off from the second line 22 via an inductance L7 and is applied to a second input 26 of the first subscriber. An in-phase regulator 36 can be used to transform the second operating voltage tapped off from the second line 22 to a voltage level that is lower in comparison with this second operating voltage and to apply it to a third input 27 of the first subscriber 3.

Figure 7:
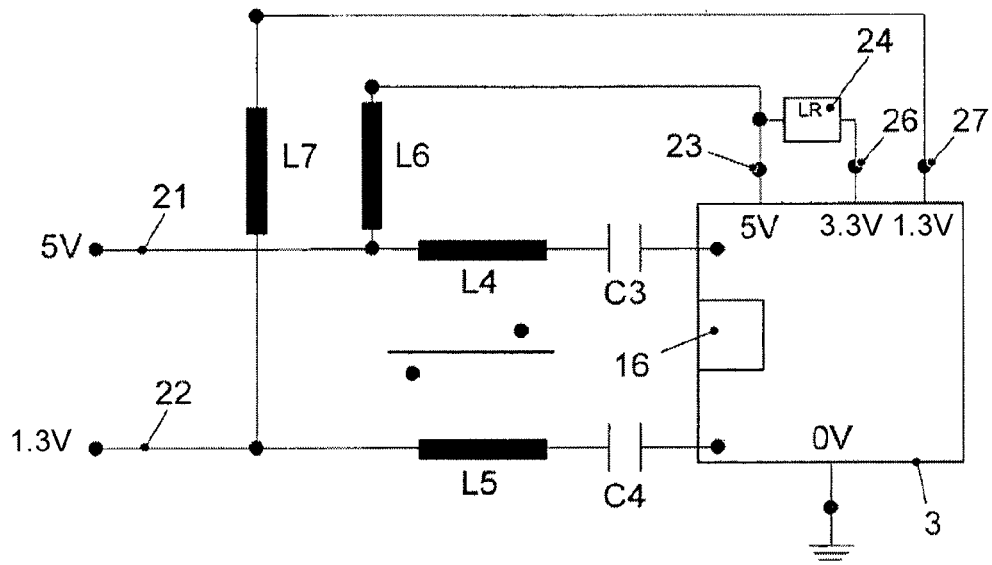
FIG. 7 shows a schematic illustration of a further disclosed embodiment of a first subscriber.

In contrast to FIG. 6, FIG. 7 shows that the first operating voltage at a level of 5 V is applied firstly to the first input 23 of the first subscriber 3 and, via a first in-phase regulator 24, to a second input 26 of the first subscriber 3. A second operating voltage, which is lower in comparison with the first operating voltage, for example at a level of 1.3 V, is impressed as a second DC voltage onto a second line 22 of the first cable 7 shown in FIG. 1. An inductance L7 is used to tap off the second DC voltage from the second line 22 and to apply it to a third input 27 of the first subscriber 3. Advantageously, the second operating voltage tapped off from the second line 22 is used as a preservation voltage for registers or memory states. Hence, in the disclosed embodiment as shown in FIG. 7, it is advantageously possible to disconnect the first operating voltage for the first and second inputs 23, 26 of the first subscriber 3 and then just to use the second line 22 to provide the second operating voltage. In this way, the information stored in the processors or memory can be preserved. This can also be called a "freeze state". In such a case, the first subscriber 3 can quickly be put back into its previous state (state at disconnection or falling asleep) when the first DC voltage at a level of 5 V is connected. It would therefore be possible to dispense with time-consuming booting or initialization.

Figure 8:
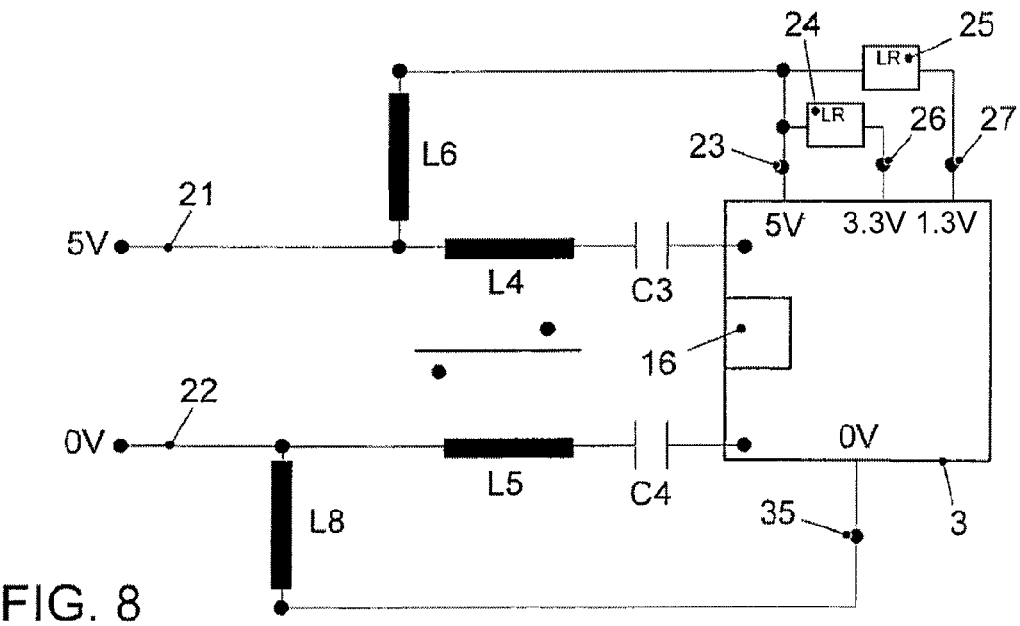
FIG. 8 shows a schematic illustration of still another disclosed embodiment of a subscriber.

In contrast to FIG. 6 and FIG. 7, FIG. 8 shows that a second line 22 is used to impress a second DC voltage of 0 V, i.e. the second line 22 is at a ground potential, particularly a potential of a vehicle ground. An inductance L8 can be used to tap off this ground potential from the second line 22 and to apply it to a ground input 35 of a first subscriber 3. This advantageously allows the operation of a first subscriber 3 without a separate connection to a vehicle ground.

LIST OF REFERENCE SYMBOLS

1 Network
2 Central subscriber
3 First subscriber
4 Second subscriber
5 Third subscriber
6 Fourth subscriber
7 First cable
8 Second cable
9 Third cable
10 Fourth cable
11 Microcontroller
12 MAC unit
13 Ethernet switch
14 Energy coupling unit
15 Energy coupling unit
16 Microcontroller
17 MAC unit
18 Physical layer
19 Controller peripheral area
20 Central supply voltage
21 First line
22 Second line
23 First input
24 First in-phase regulator
25 Second in-phase regulator
26 Second input
27 Third input
28 Detection input
29 Switching output
30 Switch
31 Voltage transformer
32 Diode
33 Switch
34 Onboard power supply system voltage
35 Ground input
36 In-phase regulator
C1 First capacitance
C2 Second capacitance
C3 First capacitance
C4 Second capacitance
L1 First inductance
L2 Second inductance
L3 Inductance
L4 First inductance
L5 Second inductance
L6 Inductance L7 Inductance
L8 Inductance

The invention claimed is:

1. A network in a motor vehicle, the network comprising:
a central subscriber and at least one first subscriber,
wherein the central subscriber and the at least one first subscriber are connected by at least one first cable,
wherein the central subscriber comprises at least one signal coupling unit and at least one energy coupling unit,
wherein the at least one signal coupling unit impresses or taps off an AC voltage onto or from at least one first line of the first cable,
wherein the at least one energy coupling unit impresses a DC voltage at a predetermined voltage level onto the at least one first line of the first cable,
wherein the at least one first subscriber comprises at least one signal coupling unit and at least one energy coupling unit,
wherein the at least one signal coupling unit of the at least one first subscriber taps off or impresses an AC voltage from or onto the at least one first line of the first cable,
wherein the at least one energy coupling unit of the at least one first subscriber taps off the DC voltage from the at least one first line of the first cable,
wherein the DC voltage is a first operating voltage for the at least one first subscriber or is transformed into the first operating voltage for the at least one first subscriber,
wherein the first operating voltage is applied to at least one first input of the at least one first subscriber,
wherein the at least one first subscriber comprises a signaling unit or the at least one first subscriber has an associated signaling unit,
wherein the signaling unit can be used to produce a requirement signal in a disconnected or sleeping state of the at least one first subscriber, wherein the requirement signal can be transmitted from the signaling unit to the central subscriber via at least one line connecting the first and central subscribers.

2. The network of claim 1, wherein the central subscriber can be used to detect the requirement signal, wherein the energy coupling unit of the central subscriber can be used to impress the DC voltage onto the at least one first line of the first cable when the requirement signal is detected.

3. The network of claim 1, wherein the signaling unit can be used to produce a requirement voltage at a predetermined voltage level as a requirement signal, wherein the energy coupling unit of the at least one first subscriber can be used to impress the requirement voltage onto a line connecting the first and central subscribers.

4. The network of claim 3, wherein the at least one energy coupling unit of the central subscriber taps off the requirement voltage from the at least one first line and applies the requirement voltage to a detection input of the central subscriber,
wherein an evaluation unit of the central subscriber is used to evaluate whether the voltage applied to the detection input exceeds a predetermined voltage level, and
wherein the energy coupling unit of the central subscriber is used to impress the DC voltage onto the at least one first line of the first cable when the voltage applied to the detection input exceeds the predetermined voltage level.

5. The network of claim 3, wherein a level of the requirement voltage is lower than a level of the first operating voltage for the at least one first subscriber and/or of an operating voltage for the central subscriber.

6. The network of claim 3, wherein the signaling unit of the at least one first subscriber comprises at least one switching unit, and
wherein the signaling unit can be connected to a voltage source by the at least one switching unit.

7. The network of claim 1, wherein the at least one energy coupling unit of the at least one first subscriber comprises at least one voltage transformer,
wherein the at least one voltage transformer is used to alter the voltage level of the first operating voltage, and
wherein the first operating voltage with the altered voltage level is applied to a second input of the at least one first subscriber.

8. The network of claim 1, wherein the first cable comprises a second line,
wherein the at least one energy coupling unit of the central subscriber is used to impress a second DC voltage of the at least one first subscriber onto the second line of the first cable,
wherein the at least one energy coupling unit of the first subscriber is used to tap off the second DC voltage from the second line of the first cable,
wherein the second DC voltage is a second operating voltage for the at least one first subscriber or is transformed into the second operating voltage, and
wherein a voltage level of the second operating voltage is equal to the voltage level of the first operating voltage, and the second operating voltage is applied to the at least one first input of the at least one first subscriber, or the voltage level of the second operating voltage is different than the voltage level of the first operating voltage, and the second operating voltage is applied to a second input of the at least one first subscriber.

9. The network of claim 8, wherein the predetermined voltage level of the voltage impressed onto the second line corresponds to a ground potential,
wherein the at least one energy coupling unit of the at least one first subscriber is used to tap off the DC voltage from the second line of the first cable and to apply the second DC voltage from the second line to a ground input of the at least one first subscriber.

10. A method for operating a network in a motor vehicle wherein the network comprises a central subscriber and at least one first subscriber, the method comprising:
connecting the central subscriber and the at least one first subscriber by at least one first cable, wherein the central subscriber comprises at least one signal coupling unit and at least one energy coupling unit;
using, in a communication state of the at least one first subscriber, the at least one signal coupling unit to impress or tap off an AC voltage onto or from at least one first line of the at least one first cable;
using the at least one energy coupling unit to impress a DC voltage at a predetermined voltage level onto the at least one first line of the at least one first cable, wherein the at least one first subscriber comprises at least one signal coupling unit and at least one energy coupling unit;
using the at least one signal coupling unit of the at least one first subscriber to tap off or impress an AC voltage from or onto the at least one first line of the at least one first cable;
using the at least one energy coupling unit of the at least one first subscriber to tap off the DC voltage from the at least one first line of the at least one first cable and to apply the DC voltage from the at least one first line of the at least one first cable to at least one first input of the at least one first subscriber, wherein the DC voltage is a first operating voltage for the at least one first subscriber, wherein the at least one first subscriber comprises a signaling unit or the at least one first subscriber has an associated signaling unit, and the method further comprises using the signaling unit to produce a requirement signal in a disconnected or sleeping state of the at least one first subscriber and transmitting the requirement signal from the signaling unit to the central subscriber via at least one line connecting the first and central subscribers.

11. The method of claim 10, wherein the central subscriber is used to detect the requirement signal, wherein the energy coupling unit of the central subscriber is used to impress the DC voltage onto the at least one first line of the first cable when the requirement signal is detected.

12. The method of claim 10, wherein the signaling unit is used to produce a requirement voltage at a predetermined voltage level as a requirement signal, wherein the energy coupling unit of the at least one first subscriber is used to impress the requirement voltage onto a line connecting the first and central subscribers.

13. The method of claim 12, wherein the at least one energy coupling unit of the central subscriber taps off the requirement voltage from the at least one first line and applies the requirement voltage to a detection input of the central subscriber, wherein an evaluation unit of the central subscriber is used to evaluate whether the voltage applied to the detection input exceeds a predetermined voltage level, and wherein the energy coupling unit of the central subscriber is used to impress the DC voltage onto the at least one first line of the first cable when the voltage applied to the detection input exceeds the predetermined voltage level.

14. The method of claim 12, wherein a level of the requirement voltage is lower than a level of the first operating voltage for the at least one first subscriber and/or of an operating voltage for the central subscriber.

15. The method of claim 12, wherein the signaling unit of the at least one first subscriber comprises at least one switching unit, and wherein the signaling unit is connected to a voltage source by the at least one switching unit.

16. The method of claim 10, wherein the at least one energy coupling unit of the at least one first subscriber comprises at least one voltage transformer, wherein the at least one voltage transformer is used to alter the voltage level of the first operating voltage, and wherein the first operating voltage with the altered voltage level is applied to a second input of the at least one first subscriber.

17. The method of claim 10, wherein the first cable comprises a second line, wherein the at least one energy coupling unit of the central subscriber is used to impress a second DC voltage of the at least one first subscriber onto the second line of the first cable, wherein the at least one energy coupling unit of the first subscriber is used to tap off the second DC voltage from the second line of the first cable, wherein the second DC voltage is a second operating voltage for the at least one first subscriber or is transformed into the second operating voltage, and wherein a voltage level of the second operating voltage is equal to the voltage level of the first operating voltage, and the second operating voltage is applied to the at least one first input of the at least one first subscriber, or the voltage level of the second operating voltage is different than the voltage level of the first operating voltage, and the second operating voltage is applied to a second input of the at least one first subscriber.

18. The method of claim 17, wherein the predetermined voltage level of the voltage impressed onto the second line corresponds to a ground potential, wherein the at least one energy coupling unit of the at least one first subscriber is used to tap off the DC voltage from the second line of the first cable and to apply the second DC voltage from the second line to a ground input of the at least one first subscriber.

* * * * *